INVENTOR.
HAROLD H. ROTH.

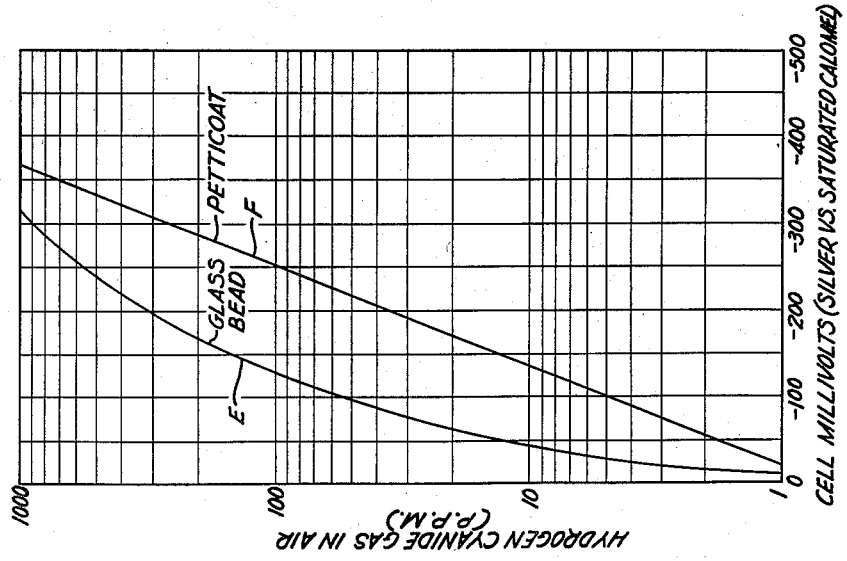
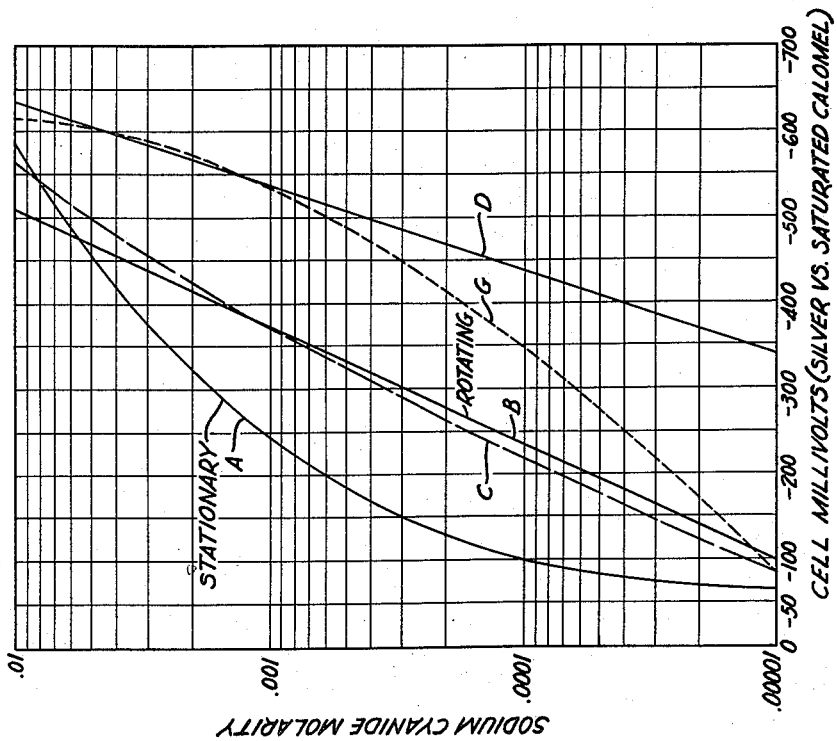

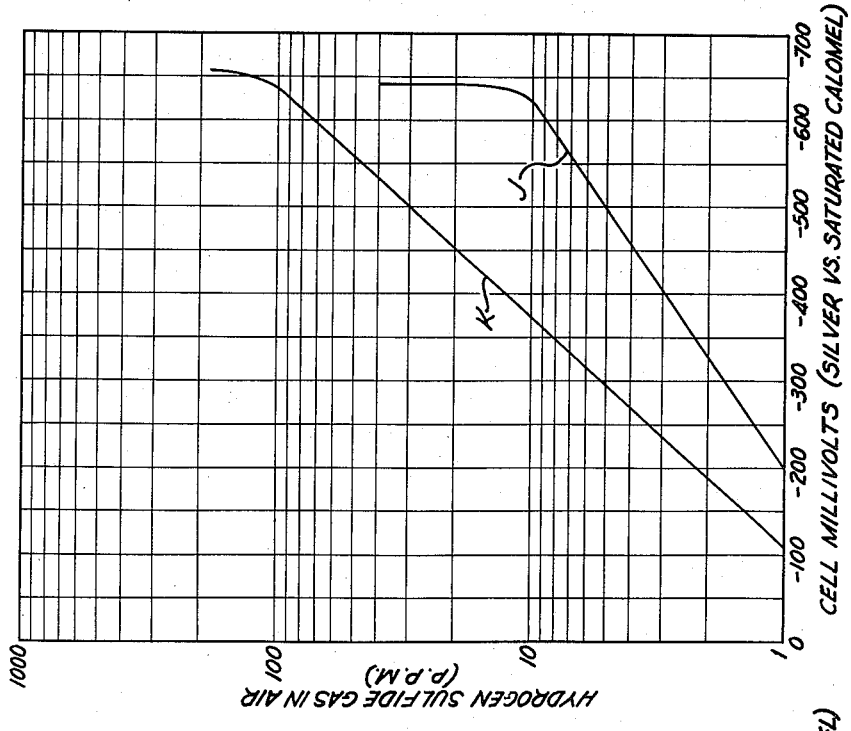
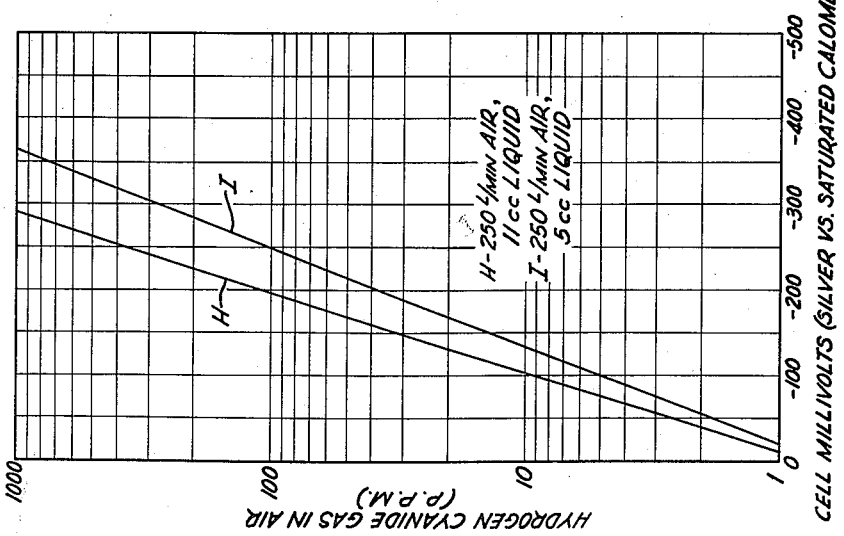

ated Dec. 16, 1958

2,864,747

DETERMINATION OF HYDROGEN CYANIDE AND HYDROGEN SULPHIDE IN AIR

Harold H. Roth, Bay City, Mich., assignor to Mine Safety Appliances Company, Pittsburgh, Pa., a corporation of Pennsylvania Application April 21, 1954, Serial No. 424,575

2 Claims. (Cl. 204—1)

This invention relates to a method of and apparatus for testing air to determine the amount of hydrogen cyanide (HCN) or of hydrogen sulfide ($H_2S$) present in it.

Despite its extreme toxicity, hydrogen cyanide has become a chemical of major importance and presently it is produced at the rate of many million pounds annually, with its rate of production increasing. Because of its toxicity the development of new and accurate methods of detecting this compound has been the object of many studies directed to improving the simplicity, rapidity and accuracy of older methods which for the most part involve the use of colorimetric indicators. However, there remains a need for a means of determining HCN in air that is applicable not only to field use, but primarily to continuous operation in the industrial production and use of it (HCN).

Hydrogen sulfide is likewise an extremely dangerous substance that is perhaps met more widely than HCN. It acts upon nerve tissue and causes systemic poisoning. Inhalation of $H_2S$ in sufficient amount causes paralysis of the nervous system (and death may ensue from respiratory failure. Various devices have been developed for detecting the presence of $H_2S$ in air, and for estimating its amount, but generally speaking, they depend upon color reactions and although, like the HCN colorimetric procedures, they are adequate for making individual determinations, they are not adapted to continuous operation.

It is among the objects of this invention to provide a method of testing air to determine the amount of hydrogen cyanide or of hydrogen sulfide present in it that is simple, is reliable, possesses adequate sensitivity to protect persons exposed to those gases, is adapted to making individual tests as well as to continuous operation coupled with, if desired, continuous recording and to activation of signal means when a predetermined concentration is present.

A further object is to provide an apparatus for practicing the method of the foregoing object that embodies its advantages, that is simple and that may be of portable nature or of a permanently installed character.

Other objects will appear from the following specification.

Figure 4:
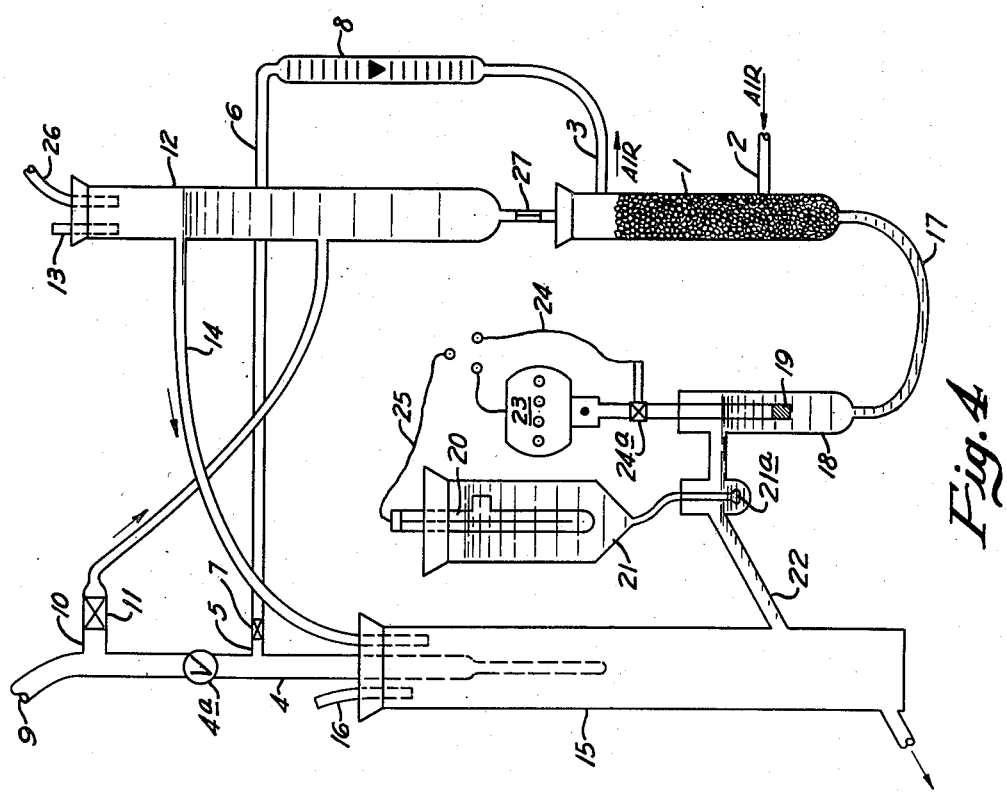
Figure 6:
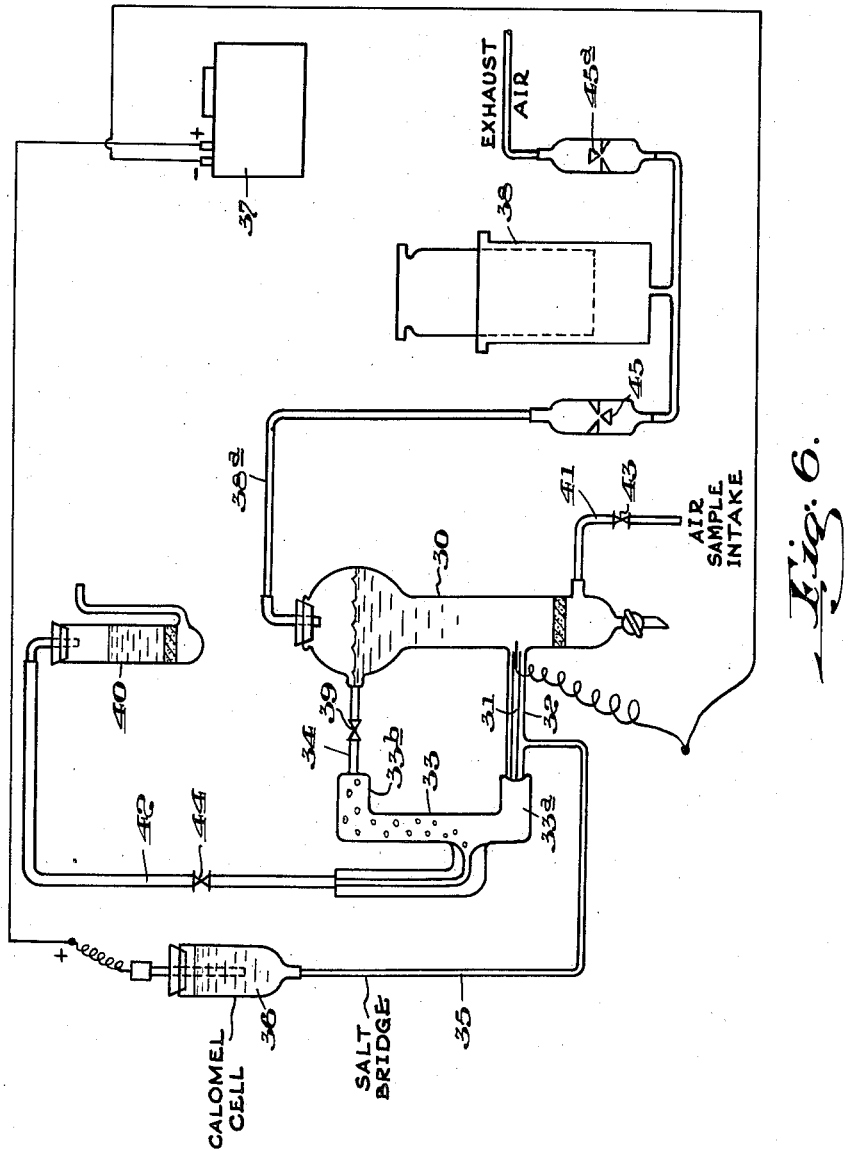

The invention will be described with reference to the accompanying drawings in which Figs. 1 to 3 are graphs illustrative of the effect of various factors upon the relationship of cyanide concentration of the E. M. F. developed by a silver half-cell;

Fig. 4 is a schematic representation of an apparatus in accordance with the invention; and Fig. 5 shows graphs similar to certain of those of Figs.1 to 3 representative of the invention as applied to hydrogen sulfide; and Fig. 6 is a schematic representation of a modified form of apparatus in accordance with the invention.

Although the invention is applicable to the detection of HCN and $H_2S$, it will for convenience, be described in detail largely with reference to HCN although it is to be understood that, as will appear more fully hereinafter, it is equally applicable to $H_2S$ determination.

In accordance with the invention, water or equivalent liquid adapted to dissolve and ionize HCN is flowed through an absorber while passing a stream of the air to be tested through it, more suitably countercurrently to the direction of water flow. The water dissolves HCN present in the air stream and the resultant solution is passed as electrolyte to a silver electrode connected by a salt bridge to a reference electrode. The cell thus constituted is connected electrically to means for measuring the electromotive force developed by the silver half-cell due to the presence of cyanide ion. Such means may be a millivoltmeter for direct reading, and if desired it may be used for operation of a continuous recorder or to actuate a signal, or both.

The operation is based on the principle that when the silver ion concentration of a silver half-cell is reduced by the presence of Cyanide ion ($CN^-$) in the electrolyte, the change affords a measure of HCN present in the air sample from which it is absorbed. Experience with the method and apparatus of the invention has shown that under the conditions now to be described there is a linear relationship between the logarithm of the concentration of cyanide and the voltage output of the cell that is sufficiently sensitive to show the presence of HCN in air in amounts far below the limits that have been set for safe exposure as well as concentrations of greater amounts ranging from those causing slight symptoms after several hours exposure to concentrations that are dangerous in short periods of time.

A highly important and critical factor is that relative movement at high velocity between the silver electrode and the cyanide solution to be established. This may be accomplished in various ways. Preferably the silver electrode is rotated in the electrolyte at high velocity, for instance in the order of 1726 R. P. M. However, this relative movement can be accomplished otherwise, as by the use of a silver wire electrode mounted in a capillary tube through which the electrolyte is passed at a rate such as to effect the necessary high velocity flow of the solution through the tube. Experience has shown that if this high relative movement between the electrode and the electrolyte is not supplied, the voltage output of the cell will be subnormal especially at low $CN^-$ concentrations, presumably due to the depletion of silver ions ($Ag^+$) in the vicinity of the electrode by the formation of insoluble silver cyanide complex $$—Ag[Ag(CN)_2]—$$

Such an action is avoided by the relative movement as a result of which the E. M. F. developed by the silver half-cell will be ideal, or nearly so, i. e., the E. M. F. cyanide relationship will be substantially linear.

Experience has shown likewise that when a fresh, clean silver electrode is used, the desired linear relationship is not obtained when it is first put into use although it does reach a stable condition after a period of use that may amount to several days, after which the cell is stabilized against further change provided contaminants do not get into the system. These electrodes may be conditioned otherwise, by forming on them a layer of black silver sulfide, whereby equilibrium conditions in use are established in less time than is the case with bright silver.

These various factors are illustrated by the curves of Fig. 1. Curve A represents the E. M. F. developed by a silver half-cell in pH 10.5 solutions of sodium cyanide varying in molarity from $10^{-5}$ to $10^{-2}$, the electrode being stationary in the quiescent electrolyte. It will be observed that the response of the cell is not linear. Curve B represents the E. M. F. developed by a similar half-cell in the cyanide solutions when the electrode is rotated at 1725 R. P. M., and it illustrates the linear relationship developed. Curve B illustrates also the excellent sensitivity of the system, there being a span of about 125 mv. per decade change of cyanide concentration throughout the range.

Curve C was obtained similarly using as the rotative electrode a clean unaged silver wire, and again a non-linear relationship is evident. Curve D was obtained under the same conditions using a silver electrode that had preliminarily been provided with a coating of black silver sulfide. The response was linear, similar to that of curve B, but it shows a large negative E. M. F. displacement compared thereto although it represents substantially the same degree of sensitivity. However, for some purposes the larger responses obtained with such sulfided electrode, as compared to cyanide-free solution may be desirable, especially where the air being tested may contain hydrogen sulfide. The solutions used in obtaining the data for curves A to D were made using distilled water.

For accuracy, efficient absorption is necessary. Various gas absorbing devices are known, among which are simple glass dip tubes and glass bead bubblers. Experience has shown that such types do not, in general, perform efficiently to effect complete absorption so that they tend not to give reliable results. It has been found, however, that petticoat bubblers perform with complete satisfaction in producing 100 percent absorption of HCN present in the air. Fig. 2 represents data obtained by passing air containing varying amounts of HCN through distilled water conditioned to pH 10.5 by sodium carbonate ($Na_2CO_3$) with the resultant solution being passed to a rotating silver electrode half-cell. Curve E shows the E. M. F. developed using a glass bead absorber from which it appears that the relationship between HCN concentration and E. M. F. of the cell is non-linear. Curve F, however, shows the results obtained when a petticoat bubbler was used, the relationship against being strictly linear. Of course, for some purposes the glass bead or dip tube absorbers may suffice.

Still another factor affecting the results is the pH of the water used for absorption. Low pH results in poor sensitivity with the development of non-linear E. M. F. However, at pH 10 or higher, the desired linear relationship is insured. I find that pH of about 10.5 is satisfactory for most purposes. This effect may be seen clearly by comparing curve D, Fig. 1, with curve G, the data for which were obtained with a similar sulfided wire using cyanide solutions made with tap water having a pH of 6.5 to 7.5. Alkalinity in excess of pH 10 may be developed by the use of caustic soda (NaOH) or, preferably, sodium carbonate. However, where tap water is of too low alkalinity and is of such nature that the alkali will cause the formation of a precipitate, which impairs the action of the cell or renders it inoperable, distilled water or deionized water corrected by alkali to the proper pH must be used.

The liquid and air flows and their ratio in the instrument have two important effects, namely, speed of response and voltage sensitivity to cyanide in the air sample. In general it may be said that with a given air flow through the absorber and a given liquid holdup between the absorber and the half-cell, the lower the liquid flow, the slower the response time will be although the cell response will be greater, as indicated by the following data, obtained with a dip tube bubbler

| Liquid Flow, cc./min. | Cell Volts, mv. | Response Time, min. | |
|---|---|---|---|
| 3.1 | 153 | 3 | Air flow, 500 cc./min. |
| 4.2 | 143 | 2 | Gas conc., 10 p. p. m. HCN. |

The effect upon cell response is shown likewise by comparison of curves H and I, Fig. 3, the data for which are given in the drawing.

On the other hand, using a given liquid flow, the higher the air flow the more concentrated will be the solution passing to the half-cell, and consequently, the higher its voltage sensitivity to cyanide will be, as indicated by the following data obtained with a glass bead absorber

| Air Flow, cc./min. | Cell Volts, mv. | |
|---|---|---|
| 250 | 43 | Liquid flow, 6 cc./min. |
| 1,000 | 142 | Gas concentration, 10 p. p. m. HCN. |
| 3,000 | 180 | |

Another factor that may affect the operation is the occurrence of other ionizable substances in the electrolyte due to their presence in the air being tested. Such substances such as sulfur dioxide ($SO_2$), carbon dioxide ($CO_2$), hydrogen chloride (HCl) and other chlorides, ammonia ($NH_3$) and various others wholly impair the action. As shown above, $H_2S$ present will cause a negative shift to the HCN voltage calibration. If such substances are likely to be present, therefore, the air passing to the system should be treated to remove them.

Having reference now to Fig. 4, the embodiment of apparatus shown comprises an absorber 1 of the conventional glass bead type although for maximum accuracy and rapidity, especially at very low concentrations of HCN, it is preferred that a petticoat bubbler be used. The air to be tested is passed to the absorber 1 through a conduit 2 and leaves by way of a conduit 3. The flow of air through the absorber may be caused in various ways, but in this embodiment it is effected by means of a water jet aspirator 4 the suction arm 5 of which is connected to exit line 3 through a conduit 6 provided with a needle valve 7 that is used to control the rate of flow as measured by a rotameter 8 in conduit 6. Aspirator 4 is connected to a water line 9 having a branch 10 provided with a valve 11 leading to a constant head tower 12 provided with a vent 13. The overflow from tower 12 passes through a conduit 14 to a waste chamber 15 vented to the atmosphere at 16.

The solution from absorber 1 passes through a line 17 to an electrode cup 18 in which there is rotatably mounted a silver electrode 19. This half-cell is associated electrically with a reference electrode. In this embodiment a calomel electrode 20 is mounted in a salt bridge 21 having a fritted disc end 21a that dips into the solution flowing through a line 22 from cup 18 to the waste chamber 15. The silver electrode 19 is connected to the shaft of a motor 23. An electrical lead 24 picks up current from the silver electrode through a commutator ring 24a on the motor shaft and the calomel electrode is connected to a lead 25. Leads 24 and 25 are connected to suitable means, not shown, responsive to the E. M. F. of the cell. Although a variety of such measuring means are available, such as a galvanometer or a millivoltmeter, it is preferred for most purposes to use a vacuum tube voltage meter or a recording potentiometer, either of which may be applied also to the actuation of a visual or an audible signal, if desired, to give warning of the occurrence of a predetermined concentration of HCN.

As indicated above, some sources of tap water may not suffice for the purposes of the invention. In such a case, line 10 is closed by valve 11 and a special absorbing solution, such as distilled water conditioned to the appropriate pH by an alkaline material, is fed to the constant head tower through an inlet line 26. Flow of the absorbing liquid to absorber 1 is in either case controlled by a capillary member 27 disposed between tower 12 and absorber 1, the diameter of the capillary being selected to give the proper liquid holdup in the absorber.

Of course, a needle valve may be substituted for the capillary 27.

In the use of this apparatus for practicing the method of the invention valve 4a in the water line is opened to create suction which draws air through the absorber 1, needle valve 7 being adjusted to provide the desired flow rate. Initially valve 11 is opened likewise, or flow of absorbing liquid initiated through conduit 26. At the same time, motor 23 is started to rotate electrode 19 at high speed in the solution from absorber 1, say at 1750 R. P. M. or higher. As the equilibrium conditions are established the voltage generated by the cell will be readable from a voltmeter or recorded if a recorder is used.

Apparatus in accordance with the invention may be calibrated readily by passing through the absorber a series of known concentrations of HCN in air and observing the E. M. F. of the cell when equilibrium has been established. In this way, there is established a calibration curve such as curve B of Fig. 1 which is then used to determine the concentration of HCN for any observed cell output. Although such concentrations may be prepared according to standard methods by metering HCN from a cylinder into known volumes of air, I have found that a simple way is to draw the air sample over the surface of a solution of sodium cyanide under standardized conditions which are (1) the solution is at 25° C., (2) 200 ml. of the solution is placed in a 500 ml. Erlenmeyer flask, (3) the air sample line is of 8 mm. O. D. and is brought within ¾ of an inch of the surface of the cyanide solution through the center of a rubber stopper having four holes spaced about the air line to distribute the entrance of air into the flask (4) the air and absorbing water to the unit are adjusted at 3 liters per minute and 100 ml. per minute, respectively, and (5) the air line must be non-reactive with and non-absorbtive of HCN, and rubber and copper tubing especially must be avoided. Chemical analysis of air samples produced under these conditions show that a range of HCN concentrations can be produced by variation of the concentration of the cyanide solution, which liberates HCN as a result of the natural content of carbon dioxide in the air:

| Concentration of NaCN soln.: | HCN, p. p. m. in air sample |
|---|---|
| 1 molar | 25 |
| 0.1 molar | 11–16 |
| 0.01 molar | 3–4 |

Air normally contains some amount of hydrogen sulfide, and because of the sensitivity of the silver electrode to sulfide, as indicated above, it is necessary to age, or condition, the apparatus before a constant voltage is obtained in the presence of HCN. That is, during the first few days of operation, there will be a tendency for the silver voltage to become increasingly negative in consequence of the development of silver sulfide on the electrode. After a few days of operation, however, constancy of the determination is attained, and experience has shown that thereafter the apparatus will function with an accuracy of the order of ±10%. Of course, this aging of the apparatus should be accomplished prior to calibration.

As indicated above, the method and apparatus of this invention are applicable likewise to the determination of hydrogen sulfide in air. The various factors described above apply in general to this determination. Experience with the invention has shown that with an air sample flow of 500 cc. per minute and a liquid flow of 3.8 cc. per minute, there is linear response applicable to a range of detection of approximately 1 to 10 p. p. m. $H_2S$ with a sensitivity span of about 425 mv. See curve J, Fig. 5. A greater range of linear response may be had by varying the flow rates; thus with an air flow of 150 cc. per min. and a liquid flow of 7 cc. per min., there is a linear variation between 1 and 100 p. p. m. with a voltage span of 550 mv., as shown by curve K, Fig. 5. It thus appears that variation in the air and liquid flows may be used, as in the case of HCN, to alter the linear range and sensitivity and accordingly the precision of indication is dependent in both cases upon such control and maintenance of constancy of flows.

It might be thought that other metals which form complex salts with cyanide might be substituted for silver as the half-cell electrode. Experience has shown that, however, copper, gold, platinum, antimony, iron and cobalt either show no sensitivity to changes in cyanide concentration or the voltage spans are so small as to be of little or no value for the purposes of this invention.

Various modifications are, of course, permissible and will occur to those working in this field. Thus, other reference electrodes may be substituted for the calomel electrode of Fig. 4. Also the necessary relative movement between the silver electrode and the solution of HCN or $H_2S$ may be had by using a silver wire as the electrode and mounting it in a capillary tube, instead of the cup 18; this use of a capillary causes the solution to flow at high velocity over the silver wire. Again, the action of $H_2S$ upon the silver electrode when used for HCN determination may be eliminated by removing it from the air passing to the absorber, and other contaminants, examples of which are given above may be eliminated likewise; means for these purposes are familiar to chemists.

Although the apparatus of Fig. 4 is adapted chiefly to permanent installation and continuous operation, the invention is applicable also to field use with portable apparatus. To this end there is provided, as shown in Fig. 6, an absorber bulb 30 of, say, 250 cc. capacity having means for discharging and refilling it. A silver wire electrode 31 passes into the lower end of the bulb through a capillary tube 32 the other end of which leads into the lower arm 33a of an air pump 33; the upper arm 33b of the air pump is connected by rubber tubing 34 to the bulb at the upper liquid level. The silver wire is connected through a salt bridge 35 to a calomel or other reference electrode 36, and the two electrodes are connected, as shown, to means, such as a vacuum tube voltmeter 37, responsive to the E. M. F. of the cell. A bulb aspirator or syringe pump 38 is connected to the absorber 30 by tubing 38a for drawing a measured amount of air into the bottom of the absorption bulb, through the liquid, and out the top of the bulb. In the use of this form of apparatus a measured volume of distilled water brought to, say, 10.5 pH by NaOH or $Na_2CO_3$ is placed in the absorber bulb. The connection between the bulb and the upper arm of the air pump is closed, as by a pinch cock 39, and the aspirator or syringe pump is actuated to draw through an inlet 41 a measured volume, e. g., 500 cc., of the air to be tested through the liquid in absorber 30, thus forming a solution of any HCN present in the air. Then the rubber tube connection 34 is opened and a slow stream of air purged of HCN by a suitable scrubber 40 is drawn through tubing 42 to the air pump thus causing the solution to circulate from the absorber through the capillary tube 32 containing the silver electrode and via the air pump back to the absorber. Flow through tubing 41 and 42 is controlled by suitable means such as valves or pinch cocks 43 and 44, respectively, while flow caused by the pump 38 is controlled by check valves 45 and 45a, as shown. If HCN was present in the air the concentration is represented by the voltmeter reading as applied to a calibration curve determined under the specific operating details. The liquid is then discharged from the bulb which is then recharged and is ready for another test.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. That method of determining a compound of the class consisting of hydrogen cyanide and hydrogen sulphide in air comprising flowing the air through an absorbing liquid having a pH of at least 10 in means to produce a solution of the compound contained in the air in said absorbing liquid, then passing the resulting solution to a silver electrode half-cell associated electrically with a reference electrode, rotating said silver electrode at a velocity of about 1725 R. P. M. to effect relative movement at high velocity between said silver electrode and said solution, and applying the E. M. F. developed by said cell to means responsive thereto to indicate the concentration of said compound in the air tested.

2. A method according to claim 1 in which said silver electrode used is provided with a black silver sulphide coating.

References Cited in the file of this patent

FOREIGN PATENTS

| | | |
|---|---|---|
| 742,588 | France | Jan. 4, 1933 |
| 885,615 | France | Sept. 21, 1943 |

OTHER REFERENCES

Muller: The Polarographic Method of Analysis, pub. by the Chemical Education Publishing Co., Easton, Pa., 1951, page 145.

"Metal Finishing," September 1945, pages 374–380, article by Gregory et al.

"Chemical Abstracts," vol. 39 (1945), page 4813, abstract of article by Robbie et al.

"Potentiometric Titrations," by Kolthoff et al., 2nd edition (1931), pages 159–161, and 170, 171.

UNITED STATES PATENT OFFICE
CERTIFICATE OF CORRECTION

Patent No. 2,864,747                                           December 16, 1958

Harold H. Roth

It is hereby certified that error appears in the printed specification of the above numbered patent requiring correction and that the said Letters Patent should read as corrected below.

Column 1, line 35, for "system (and" read -- system, and --; line 62, for "of", second occurrence, read -- to --; column 2, line 6, for "more" read -- most --; line 19, for "Cyanide" read -- cyanide --; line 34, after "solution" strike out "to"; column 3, line 39, for "against" read -- again --; line 53, after "or," insert -- and --; line 67, after "bubbler" insert a comma; column 4, line 7, after "absorber" insert a comma; line 24, for "to" read -- of --; column 5, line 39, for "show" read -- shows --.

Signed and sealed this 14th day of April 1959.

(SEAL)

Attest:

KARL H. AXLINE                                                ROBERT C. WATSON

Attesting Officer                                        Commissioner of Patents